(12) United States Patent
Chia et al.

(10) Patent No.: US 9,099,144 B1
(45) Date of Patent: Aug. 4, 2015

(54) DISK DRIVE EVALUATING LASER PERFORMANCE FOR HEAT ASSISTED MAGNETIC RECORDING

(71) Applicant: Western Digital Technologies, Inc., Irvine, CA (US)

(72) Inventors: Galvin T. Chia, Rancho Santa Margarita, CA (US); Prakash Balasubramaniam, Rancho Santa Margarita, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/052,648

(22) Filed: Oct. 11, 2013

(51) Int. Cl.
| G11B 11/00 | (2006.01) |
| G11B 13/04 | (2006.01) |
| G11B 11/105 | (2006.01) |
| G11B 7/126 | (2012.01) |
| G11B 5/00 | (2006.01) |

(52) U.S. Cl.
CPC .......... *G11B 13/04* (2013.01); *G11B 11/10595* (2013.01); *G11B 7/126* (2013.01); *G11B 11/1053* (2013.01); *G11B 2005/0021* (2013.01)

(58) Field of Classification Search
CPC ................ G11B 2005/0021; G11B 2005/0032
USPC .................... 369/13.26, 13.13, 13.33, 116, 369/47.5–47.53
See application file for complete search history.

(56) References Cited

U.S. PATENT DOCUMENTS

| 5,050,156 A | * | 9/1991 | Barton ........................... 369/116 |
| 5,463,600 A | * | 10/1995 | Kirino et al. ............... 369/13.24 |
| 6,018,789 A | | 1/2000 | Sokolov et al. |
| 6,065,095 A | | 5/2000 | Sokolov et al. |
| 6,078,452 A | | 6/2000 | Kittilson et al. |
| 6,081,447 A | | 6/2000 | Lofgren et al. |
| 6,092,149 A | | 7/2000 | Hicken et al. |
| 6,092,150 A | | 7/2000 | Sokolov et al. |
| 6,094,707 A | | 7/2000 | Sokolov et al. |
| 6,105,104 A | | 8/2000 | Guttmann et al. |
| 6,111,717 A | | 8/2000 | Cloke et al. |
| 6,145,052 A | | 11/2000 | Howe et al. |
| 6,175,893 B1 | | 1/2001 | D'Souza et al. |
| 6,178,056 B1 | | 1/2001 | Cloke et al. |
| 6,191,909 B1 | | 2/2001 | Cloke et al. |
| 6,195,218 B1 | | 2/2001 | Guttmann et al. |
| 6,205,494 B1 | | 3/2001 | Williams |
| 6,208,477 B1 | | 3/2001 | Cloke et al. |
| 6,223,303 B1 | | 4/2001 | Billings et al. |
| 6,230,233 B1 | | 5/2001 | Lofgren et al. |
| 6,246,346 B1 | | 6/2001 | Cloke et al. |
| 6,249,393 B1 | | 6/2001 | Billings et al. |
| 6,256,695 B1 | | 7/2001 | Williams |
| 6,262,857 B1 | | 7/2001 | Hull et al. |
| 6,263,459 B1 | | 7/2001 | Schibilla |
| 6,272,694 B1 | | 8/2001 | Weaver et al. |
| 6,278,568 B1 | | 8/2001 | Cloke et al. |

(Continued)

OTHER PUBLICATIONS

U.S. Appl. No. 13/827,089, filed Mar. 14, 2013, to Krichevsky et al., 26 pages.

*Primary Examiner* — Tan X Dinh

(57) ABSTRACT

A disk drive is disclosed comprising a disk and a head comprising a laser configured to heat the disk while writing to the disk. Data is written to the disk using an operating laser power applied to the laser, and then the data is read from the disk to generate a read signal. A ramp interval is measured for an amplitude of the first read signal to ramp up to a first threshold.

28 Claims, 5 Drawing Sheets

(56) References Cited

U.S. PATENT DOCUMENTS

| | | | |
|---|---|---|---|
| 6,279,089 | B1 | 8/2001 | Schibilla et al. |
| 6,289,484 | B1 | 9/2001 | Rothberg et al. |
| 6,292,912 | B1 | 9/2001 | Cloke et al. |
| 6,310,740 | B1 | 10/2001 | Dunbar et al. |
| 6,317,850 | B1 | 11/2001 | Rothberg |
| 6,327,106 | B1 | 12/2001 | Rothberg |
| 6,337,778 | B1 | 1/2002 | Gagne |
| 6,369,969 | B1 | 4/2002 | Christiansen et al. |
| 6,384,999 | B1 | 5/2002 | Schibilla |
| 6,388,833 | B1 | 5/2002 | Golowka et al. |
| 6,405,342 | B1 | 6/2002 | Lee |
| 6,408,357 | B1 | 6/2002 | Hanmann et al. |
| 6,408,406 | B1 | 6/2002 | Parris |
| 6,411,452 | B1 | 6/2002 | Cloke |
| 6,411,458 | B1 | 6/2002 | Billings et al. |
| 6,412,083 | B1 | 6/2002 | Rothberg et al. |
| 6,415,349 | B1 | 7/2002 | Hull et al. |
| 6,425,128 | B1 | 7/2002 | Krapf et al. |
| 6,441,981 | B1 | 8/2002 | Cloke et al. |
| 6,442,328 | B1 | 8/2002 | Elliott et al. |
| 6,445,524 | B1 | 9/2002 | Nazarian et al. |
| 6,449,767 | B1 | 9/2002 | Krapf et al. |
| 6,453,115 | B1 | 9/2002 | Boyle |
| 6,470,420 | B1 | 10/2002 | Hospodor |
| 6,480,020 | B1 | 11/2002 | Jung et al. |
| 6,480,349 | B1 | 11/2002 | Kim et al. |
| 6,480,932 | B1 | 11/2002 | Vallis et al. |
| 6,483,986 | B1 | 11/2002 | Krapf |
| 6,487,032 | B1 | 11/2002 | Cloke et al. |
| 6,490,635 | B1 | 12/2002 | Holmes |
| 6,493,173 | B1 | 12/2002 | Kim et al. |
| 6,499,083 | B1 | 12/2002 | Hamlin |
| 6,519,104 | B1 | 2/2003 | Cloke et al. |
| 6,525,892 | B1 | 2/2003 | Dunbar et al. |
| 6,545,830 | B1 | 4/2003 | Briggs et al. |
| 6,546,489 | B1 | 4/2003 | Frank, Jr. et al. |
| 6,550,021 | B1 | 4/2003 | Dalphy et al. |
| 6,552,880 | B1 | 4/2003 | Dunbar et al. |
| 6,553,457 | B1 | 4/2003 | Wilkins et al. |
| 6,578,106 | B1 | 6/2003 | Price |
| 6,580,573 | B1 | 6/2003 | Hull et al. |
| 6,594,183 | B1 | 7/2003 | Lofgren et al. |
| 6,600,620 | B1 | 7/2003 | Krounbi et al. |
| 6,601,137 | B1 | 7/2003 | Castro et al. |
| 6,603,622 | B1 | 8/2003 | Christiansen et al. |
| 6,603,625 | B1 | 8/2003 | Hospodor et al. |
| 6,604,220 | B1 | 8/2003 | Lee |
| 6,606,682 | B1 | 8/2003 | Dang et al. |
| 6,606,714 | B1 | 8/2003 | Thelin |
| 6,606,717 | B1 | 8/2003 | Yu et al. |
| 6,611,393 | B1 | 8/2003 | Nguyen et al. |
| 6,615,312 | B1 | 9/2003 | Hamlin et al. |
| 6,636,460 | B2 | 10/2003 | Akiyama et al. |
| 6,639,748 | B1 | 10/2003 | Christiansen et al. |
| 6,639,890 | B1 * | 10/2003 | Miura et al. ............... 369/13.26 |
| 6,647,481 | B1 | 11/2003 | Luu et al. |
| 6,654,193 | B1 | 11/2003 | Thelin |
| 6,657,810 | B1 | 12/2003 | Kupferman |
| 6,661,591 | B1 | 12/2003 | Rothberg |
| 6,665,772 | B1 | 12/2003 | Hamlin |
| 6,671,232 | B1 | 12/2003 | Stupp |
| 6,687,073 | B1 | 2/2004 | Kupferman |
| 6,687,078 | B1 | 2/2004 | Kim |
| 6,687,850 | B1 | 2/2004 | Rothberg |
| 6,690,523 | B1 | 2/2004 | Nguyen et al. |
| 6,690,882 | B1 | 2/2004 | Hanmann et al. |
| 6,691,198 | B1 | 2/2004 | Hamlin |
| 6,691,213 | B1 | 2/2004 | Luu et al. |
| 6,691,255 | B1 | 2/2004 | Rothberg et al. |
| 6,693,760 | B1 | 2/2004 | Krounbi et al. |
| 6,694,477 | B1 | 2/2004 | Lee |
| 6,697,914 | B1 | 2/2004 | Hospodor et al. |
| 6,704,153 | B1 | 3/2004 | Rothberg et al. |
| 6,708,251 | B1 | 3/2004 | Boyle et al. |
| 6,710,951 | B1 | 3/2004 | Cloke |
| 6,711,628 | B1 | 3/2004 | Thelin |
| 6,711,635 | B1 | 3/2004 | Wang |
| 6,711,660 | B1 | 3/2004 | Milne et al. |
| 6,715,044 | B2 | 3/2004 | Lofgren et al. |
| 6,724,982 | B1 | 4/2004 | Hamlin |
| 6,725,329 | B1 | 4/2004 | Ng et al. |
| 6,735,650 | B1 | 5/2004 | Rothberg |
| 6,735,693 | B1 | 5/2004 | Hamlin |
| 6,744,772 | B1 | 6/2004 | Eneboe et al. |
| 6,745,283 | B1 | 6/2004 | Dang |
| 6,751,402 | B1 | 6/2004 | Elliott et al. |
| 6,757,481 | B1 | 6/2004 | Nazarian et al. |
| 6,772,281 | B2 | 8/2004 | Hamlin |
| 6,781,826 | B1 | 8/2004 | Goldstone et al. |
| 6,782,449 | B1 | 8/2004 | Codilian et al. |
| 6,791,779 | B1 | 9/2004 | Singh et al. |
| 6,792,486 | B1 | 9/2004 | Hanan et al. |
| 6,799,274 | B1 | 9/2004 | Hamlin |
| 6,811,427 | B2 | 11/2004 | Garrett et al. |
| 6,826,003 | B1 | 11/2004 | Subrahmanyam |
| 6,826,614 | B1 | 11/2004 | Hanmann et al. |
| 6,832,041 | B1 | 12/2004 | Boyle |
| 6,832,929 | B2 | 12/2004 | Garrett et al. |
| 6,845,405 | B1 | 1/2005 | Thelin |
| 6,845,427 | B1 | 1/2005 | Atai-Azimi |
| 6,850,443 | B2 | 2/2005 | Lofgren et al. |
| 6,851,055 | B1 | 2/2005 | Boyle et al. |
| 6,851,063 | B1 | 2/2005 | Boyle et al. |
| 6,853,731 | B1 | 2/2005 | Boyle et al. |
| 6,854,022 | B1 | 2/2005 | Thelin |
| 6,862,660 | B1 | 3/2005 | Wilkins et al. |
| 6,880,043 | B1 | 4/2005 | Castro et al. |
| 6,882,486 | B1 | 4/2005 | Kupferman |
| 6,884,085 | B1 | 4/2005 | Goldstone |
| 6,888,831 | B1 | 5/2005 | Hospodor et al. |
| 6,892,217 | B1 | 5/2005 | Hanmann et al. |
| 6,892,249 | B1 | 5/2005 | Codilian et al. |
| 6,892,313 | B1 | 5/2005 | Codilian et al. |
| 6,895,455 | B1 | 5/2005 | Rothberg |
| 6,895,500 | B1 | 5/2005 | Rothberg |
| 6,898,730 | B1 | 5/2005 | Hanan |
| 6,910,099 | B1 | 6/2005 | Wang et al. |
| 6,928,470 | B1 | 8/2005 | Hamlin |
| 6,931,439 | B1 | 8/2005 | Hanmann et al. |
| 6,934,104 | B1 | 8/2005 | Kupferman |
| 6,934,713 | B2 | 8/2005 | Schwartz et al. |
| 6,940,873 | B2 | 9/2005 | Boyle et al. |
| 6,943,978 | B1 | 9/2005 | Lee |
| 6,948,165 | B1 | 9/2005 | Luu et al. |
| 6,950,267 | B1 | 9/2005 | Liu et al. |
| 6,954,733 | B1 | 10/2005 | Ellis et al. |
| 6,961,814 | B1 | 11/2005 | Thelin et al. |
| 6,965,489 | B1 | 11/2005 | Lee et al. |
| 6,965,563 | B1 | 11/2005 | Hospodor et al. |
| 6,965,966 | B1 | 11/2005 | Rothberg et al. |
| 6,967,799 | B1 | 11/2005 | Lee |
| 6,968,422 | B1 | 11/2005 | Codilian et al. |
| 6,968,450 | B1 | 11/2005 | Rothberg et al. |
| 6,973,495 | B1 | 12/2005 | Milne et al. |
| 6,973,570 | B1 | 12/2005 | Hamlin |
| 6,976,190 | B1 | 12/2005 | Goldstone |
| 6,983,316 | B1 | 1/2006 | Milne et al. |
| 6,986,007 | B1 | 1/2006 | Procyk et al. |
| 6,986,154 | B1 | 1/2006 | Price et al. |
| 6,995,933 | B1 | 2/2006 | Codilian et al. |
| 6,996,501 | B1 | 2/2006 | Rothberg |
| 6,996,669 | B1 | 2/2006 | Dang et al. |
| 7,002,926 | B1 | 2/2006 | Eneboe et al. |
| 7,003,674 | B1 | 2/2006 | Hamlin |
| 7,006,316 | B1 | 2/2006 | Sargenti, Jr. et al. |
| 7,009,820 | B1 | 3/2006 | Hogg |
| 7,023,639 | B1 | 4/2006 | Kupferman |
| 7,024,491 | B1 | 4/2006 | Hanmann et al. |
| 7,024,549 | B1 | 4/2006 | Luu et al. |
| 7,024,614 | B1 | 4/2006 | Thelin et al. |
| 7,027,716 | B1 | 4/2006 | Boyle et al. |
| 7,028,174 | B1 | 4/2006 | Atai-Azimi et al. |
| 7,031,902 | B1 | 4/2006 | Catiller |
| 7,046,465 | B1 | 5/2006 | Kupferman |

(56) References Cited

U.S. PATENT DOCUMENTS

| | | | |
|---|---|---|---|
| 7,046,488 B1 | 5/2006 | Hogg | |
| 7,050,252 B1 | 5/2006 | Vallis | |
| 7,054,937 B1 | 5/2006 | Milne et al. | |
| 7,055,000 B1 | 5/2006 | Severtson | |
| 7,055,167 B1 | 5/2006 | Masters | |
| 7,057,836 B1 | 6/2006 | Kupferman | |
| 7,062,398 B1 | 6/2006 | Rothberg | |
| 7,075,746 B1 | 7/2006 | Kupferman | |
| 7,076,604 B1 | 7/2006 | Thelin | |
| 7,082,494 B1 | 7/2006 | Thelin et al. | |
| 7,088,538 B1 | 8/2006 | Codilian et al. | |
| 7,088,545 B1 | 8/2006 | Singh et al. | |
| 7,092,186 B1 | 8/2006 | Hogg | |
| 7,095,577 B1 | 8/2006 | Codilian et al. | |
| 7,099,095 B1 | 8/2006 | Subrahmanyam et al. | |
| 7,106,537 B1 | 9/2006 | Bennett | |
| 7,106,947 B2 | 9/2006 | Boyle et al. | |
| 7,110,202 B1 | 9/2006 | Vasquez | |
| 7,111,116 B1 | 9/2006 | Boyle et al. | |
| 7,114,029 B1 | 9/2006 | Thelin | |
| 7,120,737 B1 | 10/2006 | Thelin | |
| 7,120,806 B1 | 10/2006 | Codilian et al. | |
| 7,126,776 B1 | 10/2006 | Warren, Jr. et al. | |
| 7,129,763 B1 | 10/2006 | Bennett et al. | |
| 7,133,600 B1 | 11/2006 | Boyle | |
| 7,136,244 B1 | 11/2006 | Rothberg | |
| 7,146,094 B1 | 12/2006 | Boyle | |
| 7,149,046 B1 | 12/2006 | Coker et al. | |
| 7,150,036 B1 | 12/2006 | Milne et al. | |
| 7,155,616 B1 | 12/2006 | Hamlin | |
| 7,171,108 B1 | 1/2007 | Masters et al. | |
| 7,171,110 B1 | 1/2007 | Wilshire | |
| 7,194,576 B1 | 3/2007 | Boyle | |
| 7,200,698 B1 | 4/2007 | Rothberg | |
| 7,205,805 B1 | 4/2007 | Bennett | |
| 7,206,497 B1 | 4/2007 | Boyle et al. | |
| 7,209,312 B1 * | 4/2007 | Sutardja | 360/77.07 |
| 7,215,496 B1 | 5/2007 | Kupferman et al. | |
| 7,215,771 B1 | 5/2007 | Hamlin | |
| 7,237,054 B1 | 6/2007 | Cain et al. | |
| 7,240,161 B1 | 7/2007 | Boyle | |
| 7,249,365 B1 | 7/2007 | Price et al. | |
| 7,263,709 B1 | 8/2007 | Krapf | |
| 7,274,639 B1 | 9/2007 | Codilian et al. | |
| 7,274,659 B2 | 9/2007 | Hospodor | |
| 7,275,116 B1 | 9/2007 | Hanmann et al. | |
| 7,280,302 B1 | 10/2007 | Masiewicz | |
| 7,292,774 B1 | 11/2007 | Masters et al. | |
| 7,292,775 B1 | 11/2007 | Boyle et al. | |
| 7,296,284 B1 | 11/2007 | Price et al. | |
| 7,302,501 B1 | 11/2007 | Cain et al. | |
| 7,302,579 B1 | 11/2007 | Cain et al. | |
| 7,318,088 B1 | 1/2008 | Mann | |
| 7,319,806 B1 | 1/2008 | Willner et al. | |
| 7,325,244 B2 | 1/2008 | Boyle et al. | |
| 7,330,323 B1 | 2/2008 | Singh et al. | |
| 7,346,790 B1 | 3/2008 | Klein | |
| 7,366,641 B1 | 4/2008 | Masiewicz et al. | |
| 7,369,340 B1 | 5/2008 | Dang et al. | |
| 7,369,343 B1 | 5/2008 | Yeo et al. | |
| 7,372,650 B1 | 5/2008 | Kupferman | |
| 7,375,914 B1 | 5/2008 | Dieron et al. | |
| 7,380,147 B1 | 5/2008 | Sun | |
| 7,392,340 B1 | 6/2008 | Dang et al. | |
| 7,404,013 B1 | 7/2008 | Masiewicz | |
| 7,406,545 B1 | 7/2008 | Rothberg et al. | |
| 7,415,571 B1 | 8/2008 | Hanan | |
| 7,436,610 B1 | 10/2008 | Thelin | |
| 7,437,502 B1 | 10/2008 | Coker | |
| 7,440,214 B1 | 10/2008 | Ell et al. | |
| 7,451,344 B1 | 11/2008 | Rothberg | |
| 7,471,483 B1 | 12/2008 | Ferris et al. | |
| 7,471,486 B1 | 12/2008 | Coker et al. | |
| 7,486,060 B1 | 2/2009 | Bennett | |
| 7,496,493 B1 | 2/2009 | Stevens | |
| 7,518,819 B1 | 4/2009 | Yu et al. | |
| 7,526,184 B1 | 4/2009 | Parkinen et al. | |
| 7,539,924 B1 | 5/2009 | Vasquez et al. | |
| 7,543,117 B1 | 6/2009 | Hanan | |
| 7,551,383 B1 | 6/2009 | Kupferman | |
| 7,562,282 B1 | 7/2009 | Rothberg | |
| 7,577,973 B1 | 8/2009 | Kapner, III et al. | |
| 7,596,797 B1 | 9/2009 | Kapner, III et al. | |
| 7,599,139 B1 | 10/2009 | Bombet et al. | |
| 7,619,841 B1 | 11/2009 | Kupferman | |
| 7,647,544 B1 | 1/2010 | Masiewicz | |
| 7,649,704 B1 | 1/2010 | Bombet et al. | |
| 7,653,927 B1 | 1/2010 | Kapner, III et al. | |
| 7,656,603 B1 | 2/2010 | Xing | |
| 7,656,763 B1 | 2/2010 | Jin et al. | |
| 7,657,149 B2 | 2/2010 | Boyle | |
| 7,672,072 B1 | 3/2010 | Boyle et al. | |
| 7,673,075 B1 | 3/2010 | Masiewicz | |
| 7,688,540 B1 | 3/2010 | Mei et al. | |
| 7,719,785 B2 | 5/2010 | Taniguchi et al. | |
| 7,724,461 B1 | 5/2010 | McFadyen et al. | |
| 7,725,584 B1 | 5/2010 | Hanmann et al. | |
| 7,729,087 B1 | 6/2010 | Stoev et al. | |
| 7,730,295 B1 | 6/2010 | Lee | |
| 7,751,144 B1 * | 7/2010 | Sutardja | 360/77.07 |
| 7,760,458 B1 | 7/2010 | Trinh | |
| 7,768,776 B1 | 8/2010 | Szeremeta et al. | |
| 7,804,657 B1 | 9/2010 | Hogg et al. | |
| 7,808,741 B2 | 10/2010 | Matsumoto et al. | |
| 7,813,954 B1 | 10/2010 | Price et al. | |
| 7,827,320 B1 | 11/2010 | Stevens | |
| 7,839,588 B1 | 11/2010 | Dang et al. | |
| 7,843,660 B1 | 11/2010 | Yeo | |
| 7,852,596 B2 | 12/2010 | Boyle et al. | |
| 7,859,782 B1 | 12/2010 | Lee | |
| 7,872,822 B1 | 1/2011 | Rothberg | |
| 7,898,756 B1 | 3/2011 | Wang | |
| 7,898,762 B1 | 3/2011 | Guo et al. | |
| 7,900,037 B1 | 3/2011 | Fallone et al. | |
| 7,907,364 B2 | 3/2011 | Boyle et al. | |
| 7,911,882 B2 | 3/2011 | Shimazawa et al. | |
| 7,929,234 B1 | 4/2011 | Boyle et al. | |
| 7,933,087 B1 | 4/2011 | Tsai et al. | |
| 7,933,090 B1 | 4/2011 | Jung et al. | |
| 7,934,030 B1 | 4/2011 | Sargenti, Jr. et al. | |
| 7,940,491 B2 | 5/2011 | Szeremeta et al. | |
| 7,944,639 B1 | 5/2011 | Wang | |
| 7,945,727 B2 | 5/2011 | Rothberg et al. | |
| 7,949,564 B1 | 5/2011 | Hughes et al. | |
| 7,974,029 B2 | 7/2011 | Tsai et al. | |
| 7,974,039 B1 | 7/2011 | Xu et al. | |
| 7,974,046 B2 | 7/2011 | Ota et al. | |
| 7,982,993 B1 | 7/2011 | Tsai et al. | |
| 7,984,200 B1 | 7/2011 | Bombet et al. | |
| 7,990,648 B1 | 8/2011 | Wang | |
| 7,992,179 B1 | 8/2011 | Kapner, III et al. | |
| 7,995,425 B2 | 8/2011 | Schreck et al. | |
| 8,004,785 B1 | 8/2011 | Tsai et al. | |
| 8,006,027 B1 | 8/2011 | Stevens et al. | |
| 8,014,094 B1 | 9/2011 | Jin | |
| 8,014,977 B1 | 9/2011 | Masiewicz et al. | |
| 8,019,914 B1 | 9/2011 | Vasquez et al. | |
| 8,040,625 B1 | 10/2011 | Boyle et al. | |
| 8,078,943 B1 | 12/2011 | Lee | |
| 8,079,045 B2 | 12/2011 | Krapf et al. | |
| 8,082,433 B1 | 12/2011 | Fallone et al. | |
| 8,085,487 B1 | 12/2011 | Jung et al. | |
| 8,089,719 B1 | 1/2012 | Dakroub | |
| 8,090,902 B1 | 1/2012 | Bennett et al. | |
| 8,090,906 B1 | 1/2012 | Blaha et al. | |
| 8,091,112 B1 | 1/2012 | Elliott et al. | |
| 8,094,396 B1 | 1/2012 | Zhang et al. | |
| 8,094,401 B1 | 1/2012 | Peng et al. | |
| 8,116,020 B1 | 2/2012 | Lee | |
| 8,116,025 B1 | 2/2012 | Chan et al. | |
| 8,134,793 B1 | 3/2012 | Vasquez et al. | |
| 8,134,798 B1 | 3/2012 | Thelin et al. | |
| 8,139,301 B1 | 3/2012 | Li et al. | |
| 8,139,310 B1 | 3/2012 | Hogg | |

(56) References Cited

U.S. PATENT DOCUMENTS

| | | |
|---|---|---|
| 8,144,419 B1 | 3/2012 | Liu |
| 8,145,452 B1 | 3/2012 | Masiewicz et al. |
| 8,149,528 B1 | 4/2012 | Suratman et al. |
| 8,149,652 B2 | 4/2012 | Erden et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,310,902 B1 | 11/2012 | Contreras et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,339,919 B1 | 12/2012 | Lee |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,406,090 B2 | 3/2013 | Juang et al. |
| 8,407,393 B1 | 3/2013 | Yolar et al. |
| 8,413,010 B1 | 4/2013 | Vasquez et al. |
| 8,416,650 B2 | 4/2013 | Mori et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,770 B1 | 4/2013 | O'Dell et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,441,909 B1 | 5/2013 | Thayamballi et al. |
| 8,456,643 B2 | 6/2013 | Prabhakaran et al. |
| 8,456,980 B1 | 6/2013 | Thayamballi |
| 8,458,526 B2 | 6/2013 | Dalphy et al. |
| 8,462,466 B2 | 6/2013 | Huber |
| 8,467,151 B1 | 6/2013 | Huber |
| 8,483,027 B1 | 7/2013 | Mak et al. |
| 8,489,841 B1 | 7/2013 | Strecke et al. |
| 8,493,679 B1 | 7/2013 | Boguslawski et al. |
| 8,499,198 B1 | 7/2013 | Messenger et al. |
| 8,514,506 B1 | 8/2013 | Li et al. |
| 8,514,510 B1 * | 8/2013 | Sutardja .......................... 360/75 |
| 8,554,741 B1 | 10/2013 | Malina |
| 8,560,759 B1 | 10/2013 | Boyle et al. |
| 8,576,509 B1 | 11/2013 | Hogg |
| 8,576,511 B1 | 11/2013 | Coker et al. |
| 8,578,100 B1 | 11/2013 | Huynh et al. |
| 8,578,242 B1 | 11/2013 | Burton et al. |
| 8,582,223 B1 | 11/2013 | Garani et al. |
| 8,582,231 B1 | 11/2013 | Kermiche et al. |
| 8,589,773 B1 | 11/2013 | Wang et al. |
| 8,593,753 B1 | 11/2013 | Anderson |
| 8,599,512 B2 | 12/2013 | Hogg |
| 8,605,379 B1 | 12/2013 | Sun |
| 8,611,031 B1 | 12/2013 | Tan et al. |
| 8,611,032 B2 | 12/2013 | Champion et al. |
| 8,612,798 B1 | 12/2013 | Tsai |
| 8,619,383 B1 | 12/2013 | Jung et al. |
| 8,619,508 B1 | 12/2013 | Krichevsky et al. |
| 8,619,529 B1 | 12/2013 | Liew et al. |
| 8,621,115 B1 | 12/2013 | Bombet et al. |
| 8,621,133 B1 | 12/2013 | Boyle |
| 8,625,224 B1 | 1/2014 | Lin et al. |
| 8,625,225 B1 | 1/2014 | Wang |
| 8,626,463 B2 | 1/2014 | Stevens et al. |
| 8,630,052 B1 | 1/2014 | Jung et al. |
| 8,631,188 B1 | 1/2014 | Heath et al. |
| 8,635,412 B1 | 1/2014 | Wilshire |
| 8,661,193 B1 | 2/2014 | Cobos et al. |
| 8,665,547 B1 | 3/2014 | Yeo et al. |
| 8,667,248 B1 | 3/2014 | Neppalli |
| 8,670,205 B1 | 3/2014 | Malina et al. |
| 8,671,250 B2 | 3/2014 | Lee |
| 8,681,442 B2 | 3/2014 | Hogg |
| 8,681,445 B1 | 3/2014 | Kermiche et al. |
| 8,683,295 B1 | 3/2014 | Syu et al. |
| 8,687,306 B1 | 4/2014 | Coker et al. |
| 8,687,307 B1 | 4/2014 | Patton, III |
| 8,687,313 B1 | 4/2014 | Selvaraj |
| 8,693,133 B1 | 4/2014 | Lee et al. |
| 8,698,492 B1 | 4/2014 | Mak et al. |
| 8,699,171 B1 | 4/2014 | Boyle |
| 8,699,172 B1 | 4/2014 | Gunderson et al. |
| 8,711,500 B1 | 4/2014 | Fong et al. |
| 8,711,506 B1 | 4/2014 | Giovenzana et al. |
| 8,711,665 B1 | 4/2014 | Abdul Hamid |
| 8,717,694 B1 | 5/2014 | Liew et al. |
| 8,717,695 B1 | 5/2014 | Lin et al. |
| 8,730,612 B1 | 5/2014 | Haralson |
| 8,743,502 B1 | 6/2014 | Bonke et al. |
| 8,749,911 B1 | 6/2014 | Sun et al. |
| 2007/0014197 A1 * | 1/2007 | Verschuren ................ 369/13.26 |
| 2009/0113702 A1 | 5/2009 | Hogg |
| 2010/0306551 A1 | 12/2010 | Meyer et al. |
| 2011/0205861 A1 | 8/2011 | Erden et al. |
| 2011/0226729 A1 | 9/2011 | Hogg |
| 2011/0292773 A1 | 12/2011 | Schreck et al. |
| 2011/0299367 A1 | 12/2011 | Naniwa et al. |
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0324980 A1 | 12/2012 | Nguyen et al. |
| 2013/0077453 A1 | 3/2013 | Alex |

* cited by examiner

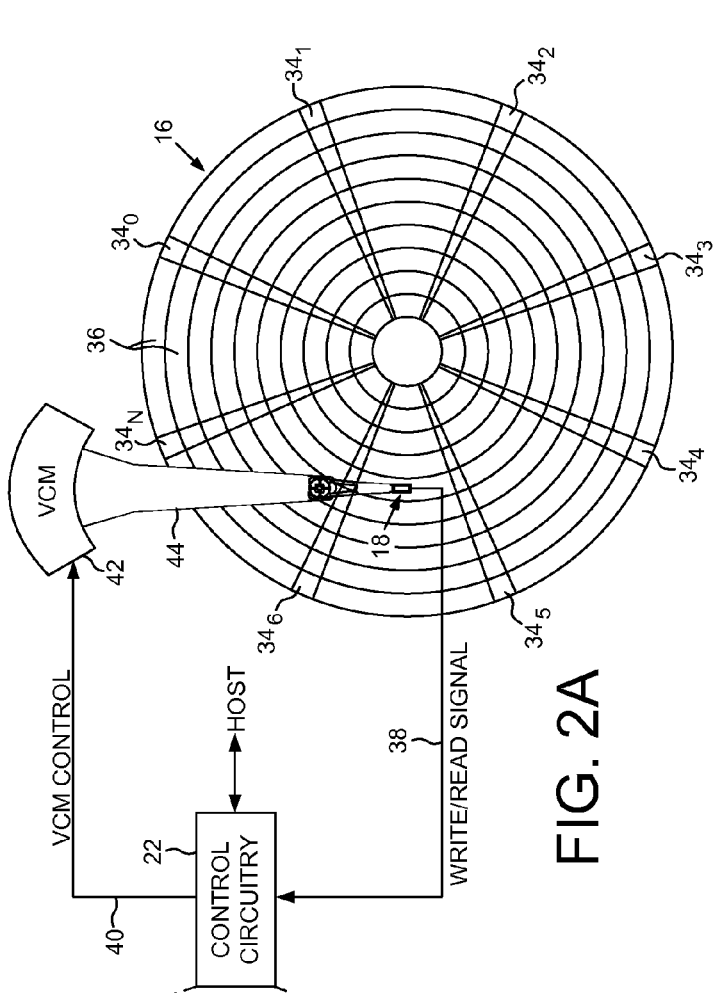
FIG. 2A
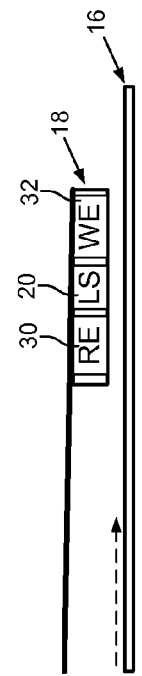
FIG. 2B
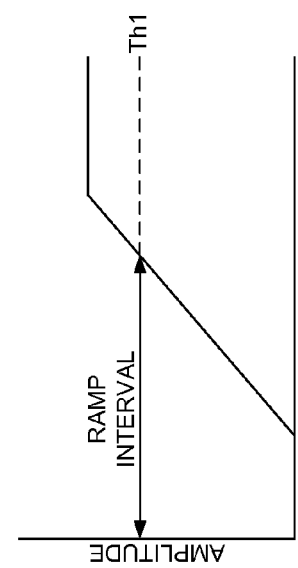
FIG. 2C
FIG. 2D

DISK DRIVE EVALUATING LASER PERFORMANCE FOR HEAT ASSISTED MAGNETIC RECORDING

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector 6, comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector 6, further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

Data is typically written to the disk by modulating a write current in an inductive coil to record magnetic transitions onto the disk surface in a process referred to as saturation recording. During readback, the magnetic transitions are sensed by a read element (e.g., a magnetoresistive element) and the resulting read signal demodulated by a suitable read channel. Heat assisted magnetic recording (HAMR) is a recent development that improves the quality of written data by heating the disk surface with a laser during write operations in order to decrease the coercivity of the magnetic medium, thereby enabling the magnetic field generated by the write coil to more readily magnetize the disk surface.

BRIEF DESCRIPTION OF THE DRAWINGS

FIG. 2A shows a disk drive according to an embodiment comprising a head actuated over a disk.

FIG. 2B shows a head according to an embodiment comprising a laser for heating the disk while writing to the disk.

FIG. 2C is a flow diagram according to an embodiment wherein data is written to and read from the disk, and the resulting read signal is processed to detect a ramp interval for an amplitude of the read signal to ramp up to a threshold.

FIG. 2D shows an example read signal ramping up to a threshold and a corresponding ramp interval according to an embodiment.

DETAILED DESCRIPTION

Figure 1:
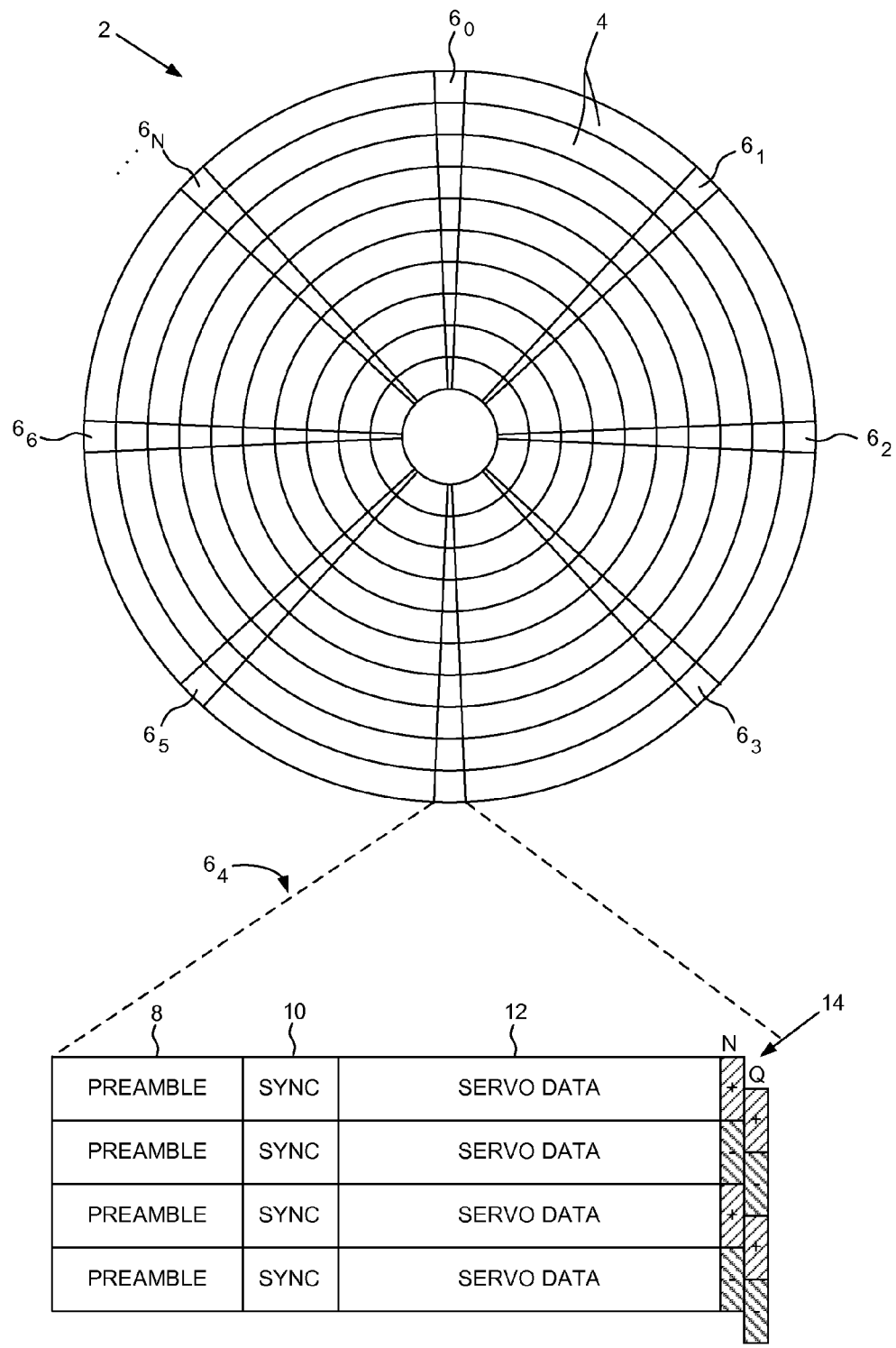
FIG. 1 shows a prior art disk format comprising a plurality of servo tracks defined by servo sectors.

FIG. 2A shows a disk drive according to an embodiment comprising a disk 16, and a head 18 (FIG. 2B) comprising a laser 20 configured to heat the disk 16 while writing to the disk 16. The disk drive further comprises control circuitry 22 configured to execute the flow diagram of FIG. 2C, wherein data is written to the disk using an operating laser power applied to the laser (block 24), and then the data is read from the disk to generate a first read signal (block 26). A ramp interval is measured for an amplitude of the first read signal to ramp up to a first threshold (block 28). An example ramp interval for an amplitude of the first read signal to reach the first threshold (Th1) is shown in FIG. 2D.

The embodiment of FIG. 2B comprises a suitable read element 30, such as a magnetoresistive read element, and a suitable write element 32, such as an inductive coil. As the disk 16 passes under the head 18, the laser 20 heats the disk surface in order to decrease the coercivity of the magnetic medium, thereby enabling the magnetic field generated by the write element 32 to more readily magnetize the disk surface. Any suitable laser may be employed in the embodiments, such as a laser diode, wherein an operating laser power is applied to the laser in order to achieve the desired level of heating during write operations. In one embodiment, the laser 20 may degrade over time requiring the operating laser power to be recalibrated (and typically increased) in order to maintain the desired level of heating. In an embodiment described below, the ramp interval shown in FIG. 2D provides an indication of when the laser has degraded to a point where the operating laser power should be recalibrated.

In the embodiment of FIG. 2A, the disk 16 comprises a plurality of servo sectors $34_0$-$34_N$ that define a plurality of servo tracks 36, wherein data tracks are defined relative to the servo tracks 36 at the same or different radial density (tracks per inch). The control circuitry 22 processes a read signal 38 emanating from the head 18 to demodulate the servo sectors $34_0$-$34_N$ and generate a position error signal (PES) representing an error between the actual position of the head and a target position relative to a target track. The control circuitry 22 processes the PES using a suitable servo control system to generate a control signal 40 applied to a voice coil motor (VCM) 42 which rotates an actuator arm 44 about a pivot in order to actuate the head 18 radially over the disk 16 in a direction that reduces the PES. In one embodiment, the disk drive may also comprise a suitable microactuator, such as a suitable piezoelectric (PZT) element for actuating the head 18 relative to a suspension, or for actuating a suspension relative to the actuator arm 44. The servo sectors $34_0$-$34_N$ may comprise any suitable head position information, such as a track address for coarse positioning and servo bursts for fine positioning. The servo bursts may comprise any suitable pattern, such as an amplitude based servo pattern or a phase based servo pattern.

In one embodiment, the operating laser power applied to the laser 20 is calibrated during a manufacturing procedure based on any suitable criteria, such as recording quality as measured by any suitable quality metric. While the disk drive is deployed in the field, the laser 20 may degrade over time causing a reduction in the recording quality due to insufficient heating of the disk surface during write operations. In one embodiment, the degradation of the laser 20 is detected by evaluating the transient response of the laser 20 at the beginning of a write operation. That is, at the beginning of a write operation when the laser power is increased to the operating laser power, there is a time constant associated with the laser 20 reaching a steady state heating of the disk surface. In one embodiment, this transient response is measured by writing data to the disk, and then evaluating the ramping amplitude of the read signal near the beginning of the written data.

Figure 3:
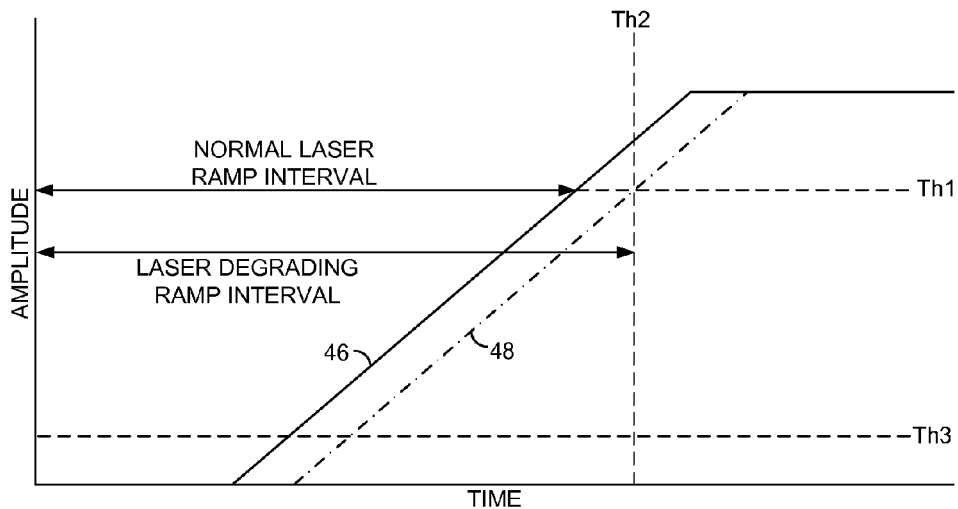
FIG. 3 shows an example according to an embodiment of a normal ramp interval for a normally operating laser, as well as a ramp interval that exceeds a threshold indicating the laser has degraded.

FIG. 3 illustrates an example ramping signal 46 representing the ramping amplitude of the read signal at the beginning of written data. In this embodiment, there is a corresponding ramp interval for the amplitude of the read signal to ramp up to a first threshold (Th1). As the laser 20 degrades over time, the ramp interval will increase and therefore the ramp interval is an indication of laser degradation. In one embodiment, the ramp interval may be measured at periodic intervals over the life of the disk drive and the ramp intervals stored in a history log. The history log may then be used for any suitable purpose, such as analyzing and improving the manufacturing process for the laser 20.

In one embodiment, the ramp interval may be compared to a second threshold to determine when the operating laser power should be recalibrated while the disk drive is deployed in the field. Referring again to FIG. 3, the ramp interval for the ramping signal 46 is less than a second threshold (Th2), and therefore the laser 20 is considered to be operating normally. When the ramp interval reaches the second threshold (Th2) as illustrated by ramping signal 48 in FIG. 3, the operating laser power may be recalibrated (and typically increased) so as to restore the desired transient response for the laser 20.

Figure 4:
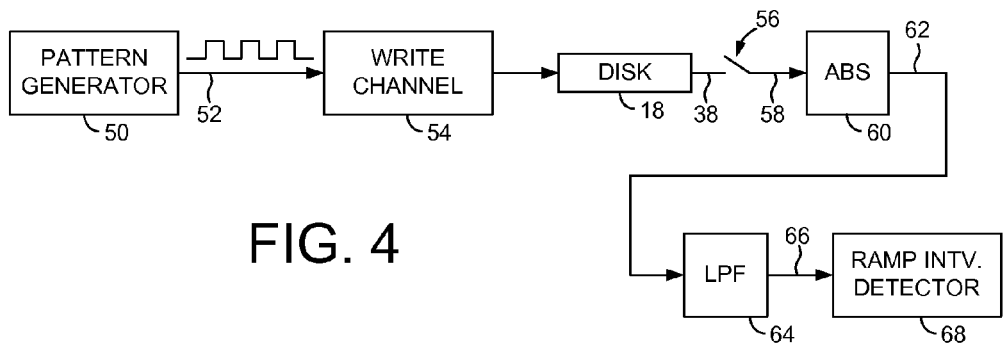
FIG. 4 shows control circuitry according to an embodiment wherein a periodic pattern is written to and read from the disk, the read signal is sampled, the signal samples rectified and low-pass filtered, and the filtered signal samples processed to detect the ramp interval.

FIG. 4 shows control circuitry according to an embodiment for measuring the ramp interval of the read signal at the beginning of written data. In this embodiment, a pattern generator 50 generates a periodic pattern 52 that is written to the disk 16 through a suitable write channel 54. The periodic pattern is then read to generate a read signal 38 which is sampled 56 to generate signal samples 58. Block 60 computes the absolute value (ABS) of the signal samples 60 to generate rectified signal samples 62. A low-pass filter (LPF) 64 filters the rectified signal samples 62 to generate filtered signal samples 66. The filtered signal samples 66 are processed at block 68 to measure the ramp interval for the amplitude of the filtered signal samples 66 to ramp up to the first threshold (Th1). In one embodiment, the ramp interval is measured relative to the number of filtered signal samples evaluated until the amplitude of the filtered signal samples 66 reaches the first threshold (Th1).

Any suitable signal may be evaluated to measure the ramp interval for the amplitude of the read signal to ramp up to the first threshold (Th1). In the embodiment of FIG. 4, block 60 computes an absolute value (ABS) of the signal samples 58, whereas in other embodiments block 60 may compute the square of the signal samples 58, extract single polarity signal samples (e.g., positive signal samples), or implement any other suitable function. In addition, the low-pass filter (LPF) 64 in FIG. 4 may be augmented or replaced with any other suitable signal processing algorithm in order to condition the signal samples prior to detecting the ramp interval at block 68.

Figure 5:
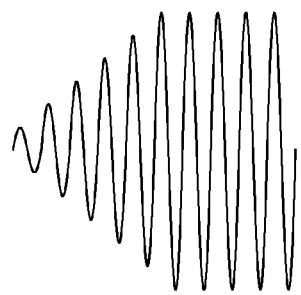
FIG. 5 shows an example wherein when writing a periodic pattern to the disk the resulting read signal comprises a ramping sinusoid.

FIG. 5 illustrates an example read signal comprising a ramping sinusoid when reading the periodic pattern 52 written to the disk as shown in FIG. 4. Any suitable frequency may be selected for the periodic pattern 52, such as a 2T, 4T, 6T etc. pattern, where T represents a signal sample interval. In one embodiment, the periodic pattern may be written to the disk at a first frequency and the resulting ramp interval measured, and then the periodic pattern may be written to the disk at a second frequency and the resulting ramp interval measured. This embodiment may provide an indication of the laser's performance over a range of data frequencies which may be used in any suitable manner, such as predicting failure of the laser, recalibrating the laser power, modifying the manufacturing process of the laser, or any other suitable purpose.

In one embodiment, when writing the periodic pattern 52 to the disk 18 as shown in FIG. 4, the control circuitry 22 may be configured into a particular operating mode to facilitate the measurement procedure. For example, during a normal operating mode the control circuitry 22 may be configured to write data to data sectors, including to write a preamble, sync mark, and payload data. However during the above described ramp interval measurement procedure, the control circuitry 22 may be configured into a test mode wherein only the periodic pattern 52 may be written to the disk 18, and in one embodiment, the periodic pattern 52 may be written with reference to the servo sectors $34_0$-$34_N$ to facilitate synchronizing to the periodic pattern 52 during the read operation. For example, the periodic pattern 52 may be written just after a target servo sector 34, so that the control circuitry 22 may be enabled during a read operation to begin reading the periodic pattern 52 as soon as the read element 30 passes over the target servo sector $34_i$.

In another embodiment, the periodic pattern written to the disk and read from the disk during the ramp interval measurement may comprise the preamble of a written data sector. That is, when writing data to a data sector, the control circuitry 22 may write a preamble and sync mark similar to the preamble and sync mark of a servo sector shown in FIG. 1, wherein the preamble comprises a periodic pattern (e.g., a 2T pattern). During a normal read operation of a data sector, the control circuitry 22 may evaluate the amplitude of the read signal at the beginning of the preamble to measure the ramp interval.

In one embodiment illustrated in FIG. 3, the ramp interval may be measured relative to two thresholds. That is, the ramp interval may start when the amplitude of the read signal reaches a third threshold (Th3) such that the ramp interval may be measured as the interval between the amplitude reaching Th3 until the amplitude reaches Th1. This embodiment may help compensate for errors in synchronizing to the beginning of the written data (e.g., the periodic pattern 52 of FIG.

4 or the preamble of a data sector). In another embodiment, the read signal samples may be buffered up to a sync mark (e.g., the sync mark in a data sector) which may then act as a reference point for identifying the beginning of the write operation.

Figure 6:
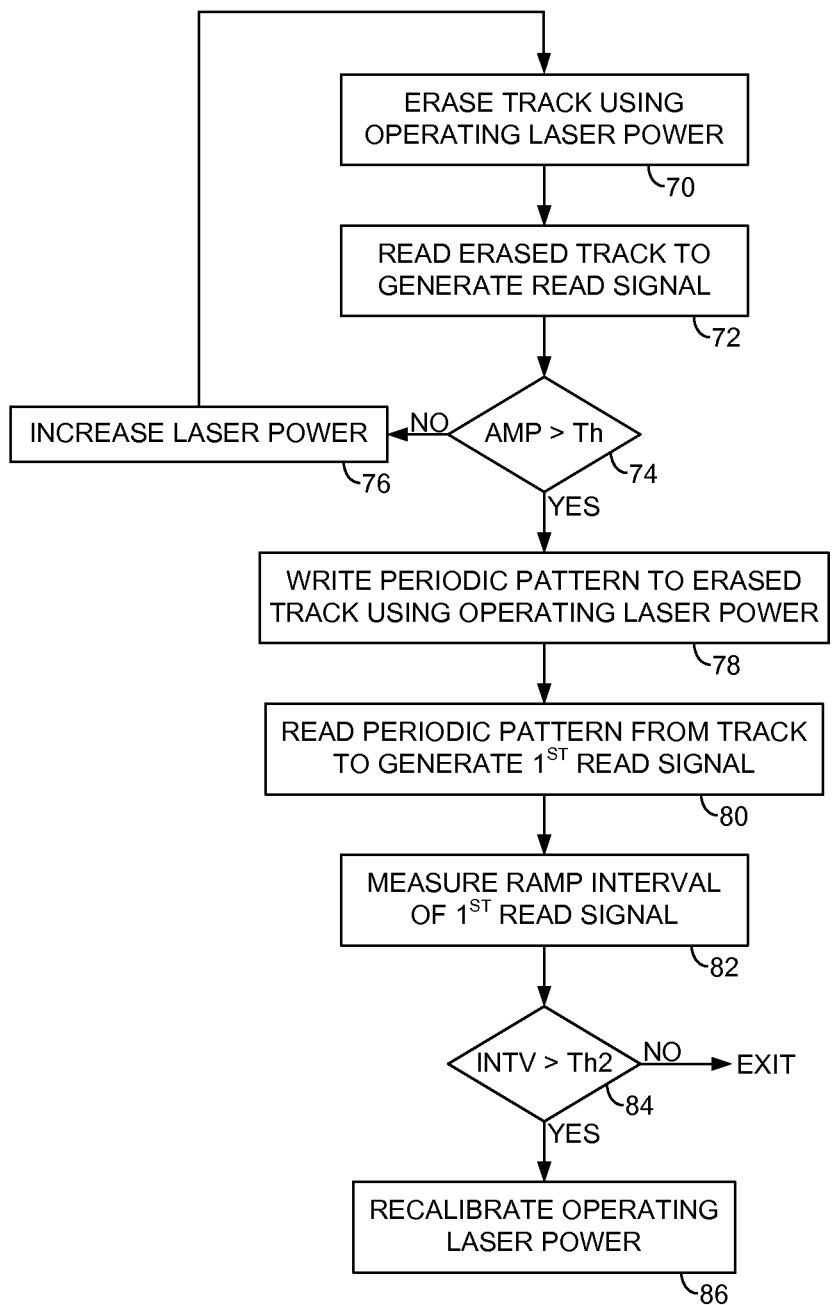
FIG. 6 is a flow diagram according to an embodiment wherein a track is erased and then read using the operating laser power to verify normal operation of the laser before writing the periodic pattern to the track and measuring the ramp interval.

FIG. 6 is a flow diagram according to an embodiment wherein a track is first erased (e.g., AC erased) using the operating laser power (block 70). The erased track is read to generate a second read signal (block 72). If the amplitude of the second read signal (e.g., average amplitude) is greater than a threshold (block 74), it means the erase operation was not successful possibly due to an inadequate laser power. Accordingly, the operating laser power is increased (block 76) and the track erased at the higher operating laser power. The flow diagram is then repeated until the amplitude of the second read signal is below the threshold at block 74 indicating a successful erase of the track. A periodic pattern is then written to the erased track (block 78), and then read from the erased track to generate the first read signal (block 80). A ramp interval for an amplitude of the first read signal to ramp up to a first threshold is measured (block 82). When the ramp interval exceeds a second threshold Th2 (block 84) indicating the laser has degraded, the operating laser power is recalibrated (block 86).

Figure 7A:
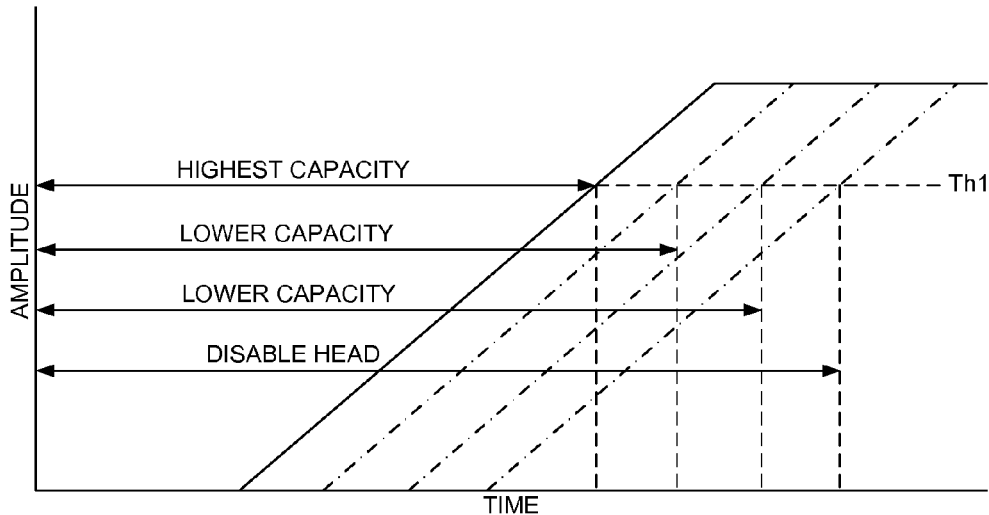
FIG. 7A illustrates an embodiment wherein the ramp interval may be used to adjust a capacity of the disk or disable the head.

The ramp interval shown in FIG. 2D may be used for any suitable purpose. FIG. 7A shows an embodiment wherein the ramp interval may be evaluated during manufacturing in order to configure a capacity of each disk surface. As shown in FIG. 7A, when the ramp interval is short indicating a higher quality laser, the capacity for the corresponding disk surface may be configured to the highest capacity, whereas as the ramp interval increases for other heads indicating a lower quality laser, the capacity for the corresponding disk surface may be decreased. In one embodiment, if the ramp interval exceeds a threshold, the laser may be considered defective and therefore the corresponding head may be disabled. That is, in a disk drive comprising multiple disk surfaces accessed by respective heads, one or more of the heads may be disabled (not used) if the corresponding ramp interval exceeds a threshold.

Figure 7B:
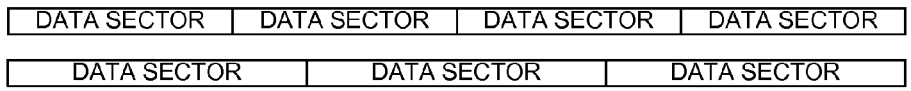
FIG. 7B shows an embodiment wherein the capacity of the disk may be adjusted based on the ramp interval by adjusting a linear density of data tracks on the disk.
Figure 7C:
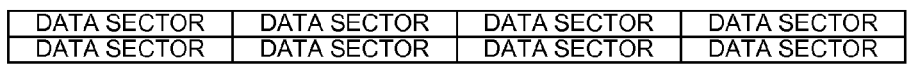
FIG. 7C shows an embodiment wherein the capacity of the disk may be adjusted based on the ramp interval by adjusting a radial density of data tracks on the disk.
Figure 7C:
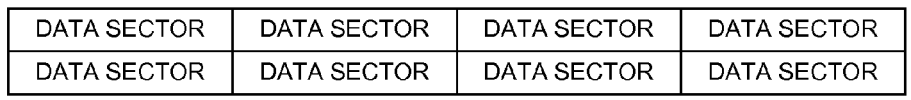
Figure 7D:
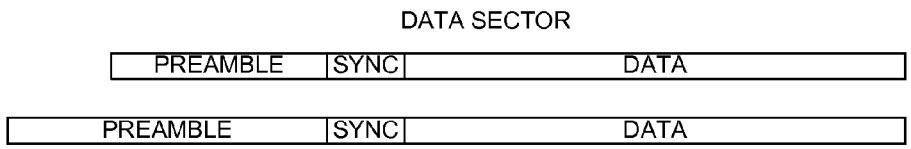
FIG. 7D shows an embodiment wherein the capacity of the disk may be adjusted by adjusting a length of a preamble of a data sector.

FIG. 7B shows an embodiment wherein the capacity of a disk surface may be adjusted based on the ramp interval by adjusting a linear density of data tracks on the disk surface. That is, a higher linear density of data tracks enables more data sectors to be recorded per data track. FIG. 7C shows an embodiment wherein the capacity of a disk surface may be adjusted based on the ramp interval by adjusting a radial density of data tracks on the disk surface. That is, a higher radial density of data tracks enables more data tracks per inch (TPI). FIG. 7D shows an embodiment wherein the capacity of a disk surface may be adjusted by adjusting a length of a preamble of a data sector. That is, a shorter ramp interval for a laser may enable a shorter preamble since the laser reaches a target heating level faster. As the ramp interval increases, a longer preamble may be needed so that the laser may heat to the target level before writing the sync mark.

In one embodiment, at the beginning of a write operation the laser power may be increased from substantially zero to the operating laser power. In another embodiment, the control circuitry may pre-heat the laser by configuring a preheat laser power during a preheat interval, where the preheat laser power may be low enough so as to not erase previously recorded data. When the head reaches the target data sector of the write operation, the control circuitry may increase the laser power from the preheat laser power to the operating laser power in order to write the preamble shown in FIG. 7D. When a preheat laser power is employed, the thresholds used to evaluate the ramp interval may be adjusted (e.g., when detecting degradation and/or adjusting a capacity of a disk surface).

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A disk drive comprising:
   a disk;
   a head comprising a laser configured to heat the disk while writing to the disk; and control circuitry configured to:
  write data to the disk using an operating laser power applied to the laser;
  read the data from the disk to generate a first read signal; and
  measure a ramp interval for an amplitude of the first read signal to ramp up to a first threshold.

2. The disk drive as recited in claim 1, wherein the control circuitry is further configured to:
  sample the first read signal to generate signal samples; and
  measure the ramp interval based on a number of the signal samples.

3. The disk drive as recited in claim 2, wherein the control circuitry is further configured to:
  filter the signal samples to generate filtered signal samples; and
  measure the ramp interval based on a number of the filtered signal samples.

4. The disk drive as recited in claim 1, wherein the control circuitry is further configured to detect a degradation of the laser when the ramp interval exceeds a second threshold.

5. The disk drive as recited in claim 4, wherein the control circuitry is further configured to recalibrate the operating laser power when the ramp interval exceeds the second threshold.

6. The disk drive as recited in claim 1, wherein the control circuitry is further configured to write the data to the disk by writing a periodic pattern to the disk.

7. The disk drive as recited in claim 1, wherein the periodic pattern comprises a preamble of a data sector.

8. The disk drive as recited in claim 1, wherein the control circuitry is further configured to:
  erase an area of the disk using the operating laser power;
  read the erased area of the disk to generate a second read signal; and
  detect degradation of the laser based on an amplitude of the second read signal.

9. The disk drive as recited in claim 8, wherein when the degradation of the laser is detected, the control circuitry is further configured to:
  increase the operating laser power;
  erase an area of the disk using the increased laser power;
  read the erased area of the disk to generate a third read signal; and
  detect degradation of the laser based on an amplitude of the third read signal.

10. The disk drive as recited in claim 9, wherein when the degradation of the laser is not detected, the control circuitry is further configured to write the data to the erased area of the disk.

11. The disk drive as recited in claim 1, wherein the control circuitry is further operable to disable the head based on the ramp interval.

12. The disk drive as recited in claim 1, wherein the control circuitry is further operable to adjust a capacity of the disk based on the ramp interval.

13. The disk drive as recited in claim 12, wherein the control circuitry is further operable to adjust the capacity of the disk by adjusting at least one of a linear density of data tracks and a radial density of data tracks.

14. The disk drive as recited in claim 12, wherein the control circuitry is further operable to adjust the capacity of the disk by adjusting a length of a preamble in a data sector.

15. A method of operating a disk drive comprising:
  writing data to a disk using an operating laser power applied to a laser of a head, wherein the laser is configured to heat the disk while writing to the disk;
  reading the data from the disk to generate a first read signal; and
  measuring a ramp interval for an amplitude of the first read signal to ramp up to a first threshold.

16. The method as recited in claim 15, further comprising:
  sampling the first read signal to generate signal samples; and
  measuring the ramp interval based on a number of the signal samples.

17. The method as recited in claim 16, further comprising:
  filtering the signal samples to generate filtered signal samples; and
  measuring the ramp interval based on a number of the filtered signal samples.

18. The method as recited in claim 15, further comprising detecting a degradation of the laser when the ramp interval exceeds a second threshold.

19. The method as recited in claim 18, further comprising recalibrating the operating laser power when the ramp interval exceeds the second threshold.

20. The method as recited in claim 15, further comprising writing the data to the disk by writing a periodic pattern to the disk.

21. The method as recited in claim 15, wherein the periodic pattern comprises a preamble of a data sector.

22. The method as recited in claim 15, further comprising:
  erasing an area of the disk using the operating laser power;
  reading the erased area of the disk to generate a second read signal; and
  detecting degradation of the laser based on an amplitude of the second read signal.

23. The method as recited in claim 22, wherein when the degradation of the laser is detected, further comprising:
  increasing the operating laser power;
  erasing an area of the disk using the increased laser power;
  reading the erased area of the disk to generate a third read signal; and
  detecting degradation of the laser based on an amplitude of the third read signal.

24. The method as recited in claim 23, wherein when the degradation of the laser is not detected, further comprising writing the data to the erased area of the disk.

25. The method as recited in claim 15, further comprising disabling the head based on the ramp interval.

26. The method as recited in claim 15, further comprising adjusting a capacity of the disk based on the ramp interval.

27. The method as recited in claim 26, further comprising adjusting the capacity of the disk by adjusting at least one of a linear density of data tracks and a radial density of data tracks.

28. The method as recited in claim 26, further comprising adjusting the capacity of the disk by adjusting a length of a preamble in a data sector.

* * * * *